(12) United States Patent
Yazdan Panah et al.

(10) Patent No.: US 8,817,687 B2
(45) Date of Patent: Aug. 26, 2014

(54) SYSTEM AND METHOD FOR CHANNEL ESTIMATION IN WIRELESS COMMUNICATIONS SYSTEMS

(75) Inventors: Ali Yazdan Panah, Austin, TX (US); Young Hoon Kwon, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 263 days.

(21) Appl. No.: 12/940,844

(22) Filed: Nov. 5, 2010

(65) Prior Publication Data

US 2011/0110252 A1    May 12, 2011

Related U.S. Application Data

(60) Provisional application No. 61/258,661, filed on Nov. 6, 2009.

(51) Int. Cl.
*H04B 7/14* (2006.01)
*H04B 7/26* (2006.01)
*H04B 7/155* (2006.01)
*H04L 25/03* (2006.01)
*H04W 84/04* (2009.01)

(52) U.S. Cl.
CPC ........ *H04B 7/2606* (2013.01); *H04L 25/03006* (2013.01); *H04B 7/15585* (2013.01); *H04W 84/047* (2013.01)
USPC .............................................. 370/315; 455/7

(58) Field of Classification Search
CPC ..................... H04L 25/0208; H04L 25/03254; H04L 25/03006; H04B 7/15585; H04B 7/2606
See application file for complete search history.

(56) References Cited

U.S. PATENT DOCUMENTS

| | | | | |
|---|---|---|---|---|
| 6,640,088 B2 * | 10/2003 | Thomas et al. | ............ | 455/67.11 |
| 6,885,708 B2 * | 4/2005 | Thomas et al. | ............... | 375/260 |
| 7,149,239 B2 * | 12/2006 | Hudson | .................. | 375/144 |
| 7,616,557 B2 * | 11/2009 | Yeh et al. | ..................... | 370/208 |
| 7,656,969 B2 * | 2/2010 | Strong | ......................... | 375/316 |
| 7,684,502 B2 * | 3/2010 | Kurobe et al. | ................ | 375/260 |
| 7,778,607 B2 * | 8/2010 | Withers et al. | ............. | 455/67.11 |
| 7,924,940 B2 * | 4/2011 | Kurobe et al. | ................ | 375/295 |
| 8,098,713 B2 * | 1/2012 | Baxley et al. | ................. | 375/145 |
| 8,134,976 B2 * | 3/2012 | Wallace et al. | ............... | 370/332 |
| 8,155,046 B2 * | 4/2012 | Jung et al. | ..................... | 370/315 |
| 8,199,794 B2 * | 6/2012 | Bauch et al. | .................. | 375/211 |
| 8,244,190 B2 * | 8/2012 | Larsson et al. | ................. | 455/78 |

(Continued)

OTHER PUBLICATIONS

Gao, F., et al., "On Channel Estimation for Amplify-and-Forward Two-Way Relay Networks," IEEE Global Telecommunications Conference, 2008, 5 pages.

(Continued)

*Primary Examiner* — Gregory Sefcheck
(74) *Attorney, Agent, or Firm* — Slater & Matsil, L.L.P.

(57) ABSTRACT

A system and method for channel estimation in wireless communications systems are provided. A method for operations at a first communications device includes computing an estimate of a channel between the first communications device and a second communications device based on pilot signals transmitted from the second communications device, removing self-interference from a composite transmission relayed from a relay node, and detecting information contained in the transmissions from the second communications device from the composite transmission based on the estimate of the channel. The composite transmission includes transmissions from the first communications device and transmissions from the second communications device.

25 Claims, 5 Drawing Sheets

(56) References Cited

U.S. PATENT DOCUMENTS

| | | | | |
|---|---|---|---|---|
| 8,295,262 | B2* | 10/2012 | Muharemovic et al. | 370/344 |
| 8,442,098 | B2* | 5/2013 | Park et al. | 375/211 |
| 8,509,267 | B2* | 8/2013 | Kim et al. | 370/503 |
| 8,670,716 | B2* | 3/2014 | Yu et al. | 455/63.1 |
| 2003/0043887 | A1* | 3/2003 | Hudson | 375/144 |
| 2003/0114164 | A1* | 6/2003 | Thomas et al. | 455/452 |
| 2006/0209671 | A1* | 9/2006 | Khan et al. | 370/208 |
| 2011/0110252 | A1* | 5/2011 | Panah et al. | 370/252 |

OTHER PUBLICATIONS

Gao, F., et al., "On Channel Estimation and Optimal Training Design for Amplify and Forward Relay Networks," IEEE Transactions on Wireless Communications, vol. 7, No. 5, May 2008, pp. 1907-1916.

Hassibi, B., et al., "How Much Training is Needed in Multiple-Antenna Wireless Links?," IEEE Transactions on Information Theory, vol. 49, No. 4, Apr. 2003, pp. 951-963.

Rankov, B., et al., "Spectral Efficient Signaling for Half-duplex Relay Channels," In Proceedings Asilomar Conference on Signals, Systems and Computers, 2005, 6 pages.

\* cited by examiner

SYSTEM AND METHOD FOR CHANNEL ESTIMATION IN WIRELESS COMMUNICATIONS SYSTEMS

This application claims the benefit of U.S. Provisional Application No. 61/258,661, filed Nov. 6, 2009, entitled "Flexible Pilot Structure and Channel Estimation Methods for Wireless Relay Systems," which application is hereby incorporated herein by reference.

TECHNICAL FIELD

The present invention relates generally to wireless communications and, more particularly, to a system and method for channel estimation in wireless communications systems.

BACKGROUND

Two-way relaying is a new paradigm for wireless communications using relay nodes (RN). In conventional relaying strategies, the RN only processes uplink or downlink data packets at any given time. Thus a full transmission cycle (defined as one complete uplink-downlink transmission) will require four channel resources, e.g., time slots. In two-way relaying, the RN simultaneously processes both the uplink and downlink signals. The RN may first receive the signals from the eNB (downlink (DL)) and from the UE (uplink (UL)). It then combines (e.g., adds) both signals and transmits the combined signals to both the UE and the eNB. The UE and eNB remove the self-interference terms and subsequently decode their intended packets. Therefore, one transmission cycle is performed in two channel resources and spectral efficiency is potentially increased.

Channel estimation for coherent transmissions involves the use of pilot symbols that known a-priori to both the transmitter and receiver. Each terminal (i.e., the transmitter and the receiver) uses this knowledge and the received signals (potentially corrupted with noise) to estimate the channel response using an array of methods, such as least squares estimation (LSE).

SUMMARY OF THE INVENTION

These and other problems are generally solved or circumvented, and technical advantages are generally achieved, by preferred embodiments of the present invention which provide a system and method for channel estimation in wireless communications systems.

In accordance with a preferred embodiment of the present invention, a method for operations at a first communications device is provided. The method includes computing an estimate of a channel between the first communications device and a second communications device based on pilot signals transmitted from the second communications device, removing self-interference from a composite transmission relayed to the first communications device from a relay node, and detecting information contained in the transmissions from the second communications device from the composite transmission based on the estimate of the channel. The composite transmission includes transmissions from the first communications device and transmissions from the second communications device.

In accordance with another preferred embodiment of the present invention, a communications device is provided. The communications device includes a channel estimator, a self-interference remover coupled to the channel estimator, and a data detector coupled to the self-interference remover and to the channel estimator. The channel estimator estimates a channel between the communications device and a remote communications device based on pilot signals transmitted from the remote communications device, the self-interference remover removes self-interference from a composite transmission related to the communications device from a relay node, and the data detector detects information contained in transmissions from the remote communications device from the composite transmission based on the estimate of the channel. The composite transmission includes transmissions from the communications device and transmissions from the remote communications device.

In accordance with another preferred embodiment of the present invention, a communications device is provided. The communications device includes a channel estimate unit, a data detect unit coupled to the channel estimate unit, and a buffer coupled to the data detect unit. The channel estimate unit estimates a channel between the communications device and a remote communications device based on a composite transmission that includes transmissions from the communications device and the remote communications device, the data detect unit detects information contained in the composite transmission based on the estimate of the channel, and the buffer buffers the composite transmission based on an operating mode of the communications device.

An advantage of an embodiment is that a requirement of equal length training intervals is eliminated, thereby providing more flexibility in communications, especially when a first terminal is more capable than a second terminal, e.g., an enhanced NodeB (eNB) and a user equipment (UE).

A further advantage of an embodiment is that non-overlapping training intervals are provided, which may be more suitable for multiple input, multiple output (MIMO) operation.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership Project (3GPP) Long Term Evolution (LTE) compliant communications system with two-way relaying. The invention may also be applied, however, to other communications systems, such as WiMAX compliant communications systems, that support two-way relaying.

Figure 1:
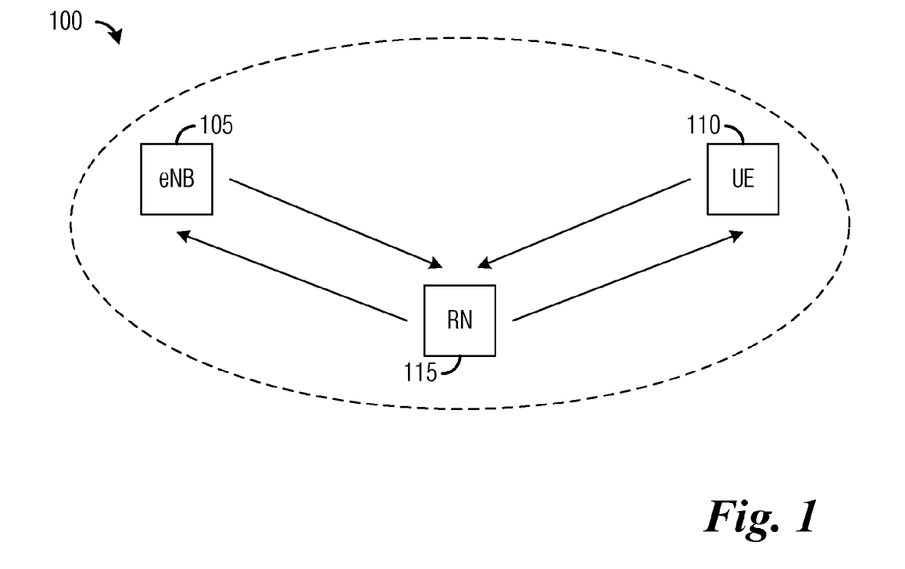
FIG. 1 is a diagram of a communications system.

FIG. 1 illustrates a communications system 100. Communications system 100 includes an eNB 105 (also commonly referred to as a base station, base terminal station, controller, access point, and so forth) serving a UE 110 (also commonly referred to as a mobile station, communications device, user, terminal, subscriber, and so on). eNB 105 may control transmissions to and from UE 110.

Also in communications system 100 is a RN 115. RN 115 may operate as an amplify-and-forward relay wherein transmissions from eNB 105 (and/or UE 110) may be received by RN 115, amplified, and then transmitted to UE 110 (and/or eNB 105). As discussed previously, RN 115 may serve as a two-way relay, wherein in a first resource, RN 115 receives transmissions from eNB 105 and UE 110 and combines (e.g., adds) the two transmissions. In a second resource, RN 115 may transmit the combination of the two transmissions to both eNB 105 and UE 110.

For discussion purposes, assume that transmissions between eNB 105 and UE 110 via RN 115 are coherent, meaning that eNB 105 and UE 110 need prior information regarding a channel over which the transmissions occur. A conventional method for obtaining information about the channel is to perform channel estimation using pilot signals transmitted over the channels. The pilot signals may be multiplexed within data streams in both UL channels (UE to eNB) and DL channels (eNB to UE). The conventional method (also known as pilot-symbol-aided modulation) may be used in two-way amplify-and-forward relaying and for multiple antenna links.

Figure 2:
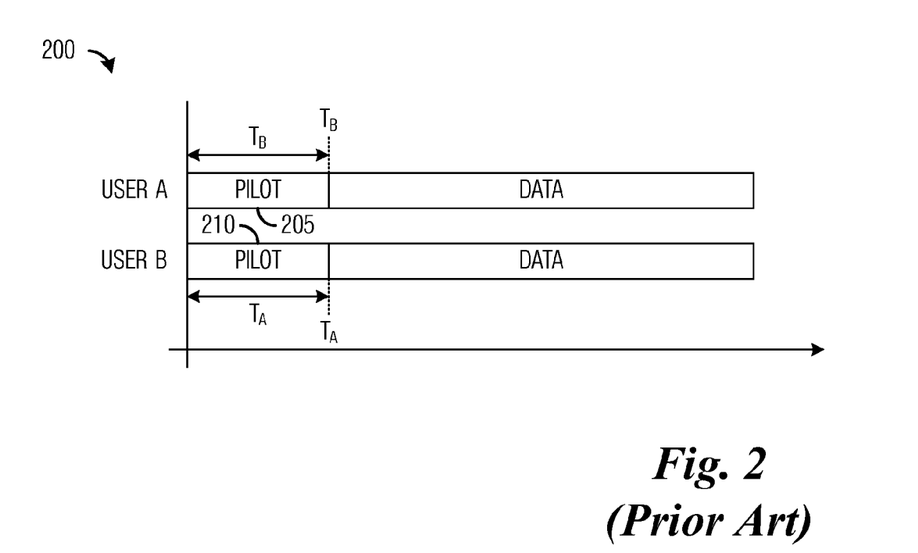
FIG. 2 is a transmission diagram of transmissions made over a single transmission frame by user A and user B using a prior art technique.

FIG. 2 illustrates a transmission diagram 200 of transmissions made over a single transmission frame by user A and user B using a prior art technique. Transmission diagram 200 illustrates the transmission of pilot signals by user A and user B to perform pilot-symbol-aided modulation. As shown in FIG. 2, the pilot symbols (shown as interval 205 for user A and interval 210 for user B) occur at the same time and are identical in duration ($T_A = T_B$). Since the pilot symbols are transmitted at the same time and over identical durations, the same amount of resources in a communications system are symmetric for both user A and user B.

The prior art technique enforces equal channel estimation qualities at both user A and user B, which may be problematic if the transmitted power from one user (for example, an eNB) is significantly higher than that of another user (for example, a UE), meaning that the link quality from the channel from eNB-to-UE is generally better than the channel in the reverse direction. Furthermore, the training intervals must completely overlap. In other words, both users (user A and user B) must either be sending data packets or pilot signals, which may be problematic in terms of supporting latency sensitive transmissions, such as voice over IP (VoIP) packets, which may need to be transmitted prior to pilot signals.

A flexible channel estimation technique for two-way relaying is presented herein. The flexible channel estimation technique allows for estimation periods of unequal duration. Furthermore, the estimation periods do not have to overlap.

Figure 3A:
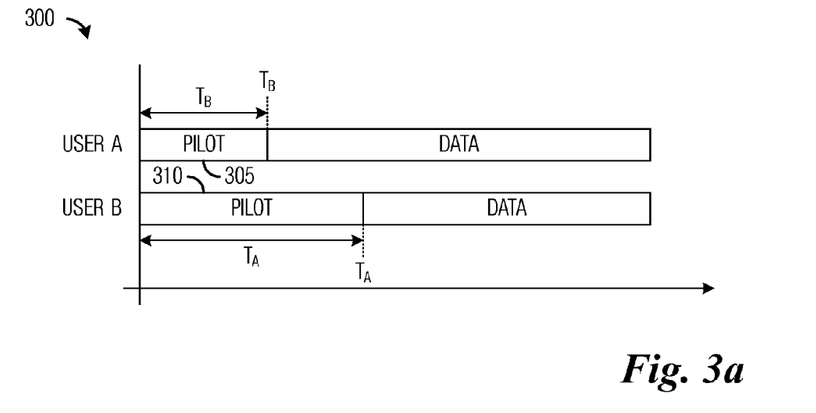
FIG. 3a is a transmission diagram of transmissions made over a single transmission frame by user A and user B, wherein estimation periods have unequal duration.

FIG. 3a illustrates a transmission diagram 300 of transmissions made over a single transmission frame by user A and user B, wherein estimation periods have unequal duration (i.e., user A and user B are operating in an unequal estimation period mode). Transmission diagram 300 illustrates the transmission of pilot signals by user A and user B to perform pilot-symbol-aided modulation. As shown in FIG. 3a, the pilot symbols are transmitted during intervals of different duration. User A transmits its pilot symbols in interval 305 with a duration of $T_B$, while user B transmits its pilot symbols in interval 310 with a duration of $T_A$.

Without loss of generality, assume that $T_A > T_B$. For discussion purposes, let user B represent an eNB and user A represent a UE, with both being a part of a 3GPP LTE compliant communications system. At each time instance, each user may be constrained by an average transmission power over all of its antennas and a RN acts as an amplify-and-forward unit.

Each transmission cycle (defined as the transmission of one vector of symbols from the UE to the eNB and vice versa) occurs in two consecutive time slots (as is conventional with two-way, bi-directional, relaying). During the first time slot the RN receives the two transmitted vectors from the UE and eNB and in a second time slot the RN broadcasts a single scaled vector composition (e.g., an addition) of the received vectors. The UE and the eNB receive two signal components.

For each user, a first component is a self-interference (SI) component resulting from its own transmission while a second component is an intended signal from the other user.

Figure 3B:
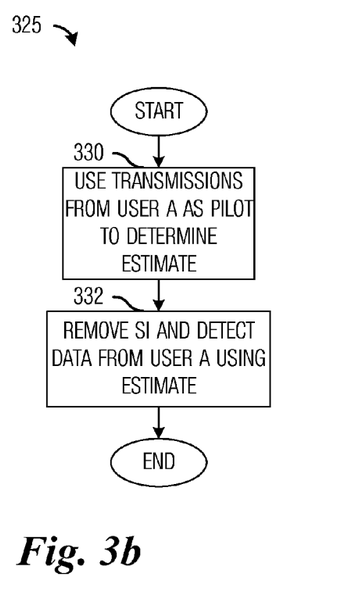
FIG. 3b is a flow diagram of communications device operations in detecting information from a transmission relayed by a two-way RN, wherein the communications device transmits a longer estimation period.

FIG. 3b illustrates a flow diagram of communications device operations 325 in detecting information from a transmission relayed by a two-way RN, wherein the communications device transmits a longer estimation period. Communications device operations 325 may be indicative of operations occurring in a communications device, such as user B (for example, an eNB), wherein the communications device transmits a longer estimation period. Communications device operations 325 may occur while the communications device is in a normal operating mode.

Communications device operations 325 may begin with the communications device using pilot signals transmitted by another communications device (e.g., user A) and relayed to the communications device by the RN in the form of a composite signal to perform estimation on a channel between the communications device and the other communications device (block 330). According to an embodiment, the communications device may use LSE to perform the channel estimation. The communications device may use the channel estimate to remove SI and detect information contained in the transmission for a remainder of a transmission frame (block 332). Communications device operations 325 may then terminate.

Referencing FIG. 3a, up until time $T_B$, the communications device may make use of pilot signals transmitted by the other communications device to perform channel estimation. After time $T_B$, when the other communications device begins to transmit information, the communications device may utilize the channel estimate to detect the information.

Figure 3C:
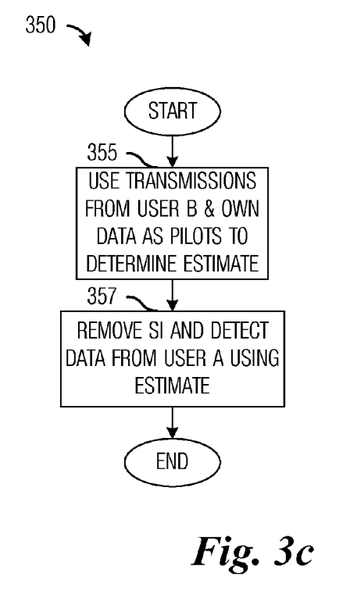
FIG. 3c is a flow diagram of communications device operations in detecting information from a transmission relayed by a two-way RN, wherein the communications device transmits a shorter estimation period.

FIG. 3c illustrates a flow diagram of communications device operations 350 in detecting information from a transmission relayed by a two-way RN, wherein the communications device transmits a shorter estimation period. Communications device operations 350 may be indicative of operations occurring in a communications device, such as user A (for example, a UE), wherein the communications device transmits a shorter estimation period. Communications device operations 350 may occur while the communications device is in a normal operating mode.

Communications device operations 350 may begin with the communications device using pilot signals transmitted by another communications device (e.g., user B) and relayed to the communications device by the RN in the form of a composite signal along with its own transmissions (which are information and not pilot signals) to perform estimation on a channel between the communications device and the other communications device (block 355). According to an embodiment, the communications device may use LSE to perform the channel estimation. The communications device may use the channel estimate to remove SI and detect information contained in the transmission for a remainder of a transmission frame (block 357). Communications device operations 350 may then terminate.

Referencing FIG. 3a, up until time $T_A$, the communications device receives and stores information from the other communications device by way of the RN. Before time $T_B$, the communications device may treat the information from the other communications device as regular pilot signals, while between times $T_B$ and $T_A$, the communications device may treat its own transmissions as pilot signals. The communications device may estimate the channel using the pilot signals. After time $T_A$, the communications device may use the channel estimate to detect the information.

Figure 4A:
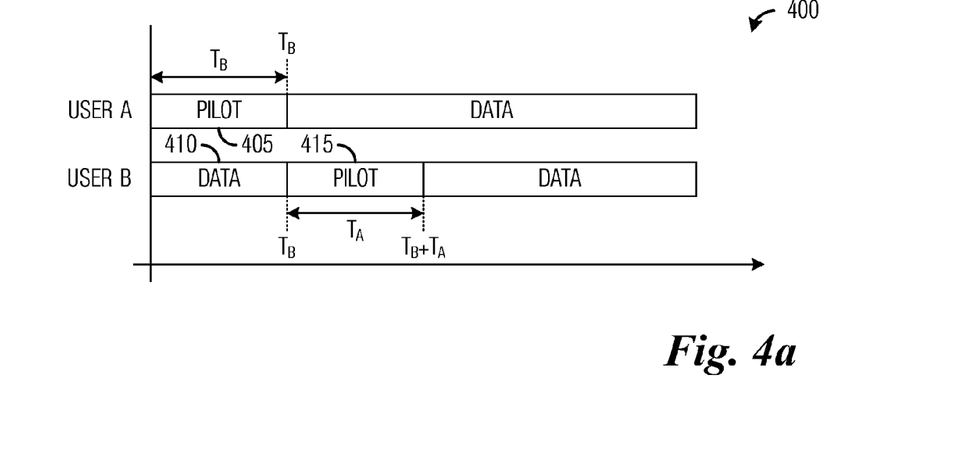
FIG. 4a is a transmission diagram of transmissions made over a single transmission frame by user A and user B, wherein estimation periods are non-overlapping.

FIG. 4a illustrates a transmission diagram 400 of transmissions made over a single transmission frame by user A and user B, wherein estimation periods are non-overlapping (i.e., user A and user B are operating in a non-overlapping estimation period mode). Transmission diagram 300 illustrates the transmission of pilot signals by user A and user B to perform pilot-symbol-aided modulation. As shown in FIG. 4a, the pilot symbols are transmitted over non-overlapping intervals. User A transmits its pilot symbols in interval 405 with duration $T_A$, while at the same time, user B transmits information (shown as interval 410). User B transmits its pilot symbols in interval 415 with duration $T_A$.

Without loss of generality, assume that $T_A > T_B$. For discussion purposes, let user B represent an eNB and user A represent a UE, with both being a part of a 3GPP LTE compliant communications system. At each time instance, each user may be constrained by an average transmission power over all of its antennas and a RN acts as an amplify-and-forward unit. Although the two estimation periods are shown to be contiguous in time, there may be a time gap between the two estimation periods.

Figure 4B:
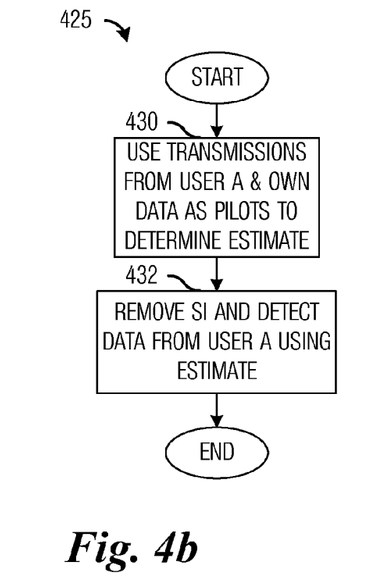
FIG. 4b is a flow diagram of communications device operations in detecting information from a transmission relayed by a two-way RN, wherein the communications device transmits a second estimation period.

FIG. 4b illustrates a flow diagram of communications device operations 425 in detecting information from a transmission relayed by a two-way RN, wherein the communications device transmits a second estimation period. Without loss of generality, in a non-overlapping transmission of estimation periods, one communications device may be considered to be communications device that transmits its estimation period second. Communications device operations 425 may be indicative of operations occurring in a communications device, such as user B (for example, an eNB), wherein the communications device transmits the second estimation period. Communications device operations 425 may occur while the communications device is in a normal operating mode.

Communications device operations 425 may begin with the communications device using pilot signals transmitted by another communications device (e.g., user A) and relayed to the communications device by the RN in the form of a composite signal to perform estimation on a channel between the communications device and the other communications device (block 430). According to an embodiment, the communications device may use LSE to perform the channel estimation. The communications device may use the channel estimate to remove SI and detect information contained in the transmission for a remainder of a transmission frame (block 432). Communications device operations 425 may then terminate.

Referencing FIG. 4a, from the beginning of the transmission frame until time $T_B$, user B transmits information while it receives pilot signals from user A. At time $T_B$, user B uses its own transmitted information and the pilot signal from user A to estimate the channel, for example, using LSE. From time $T_B$ forward, user B may use the channel estimate to remove SI and detect the information transmitted by user A.

Figure 4C:
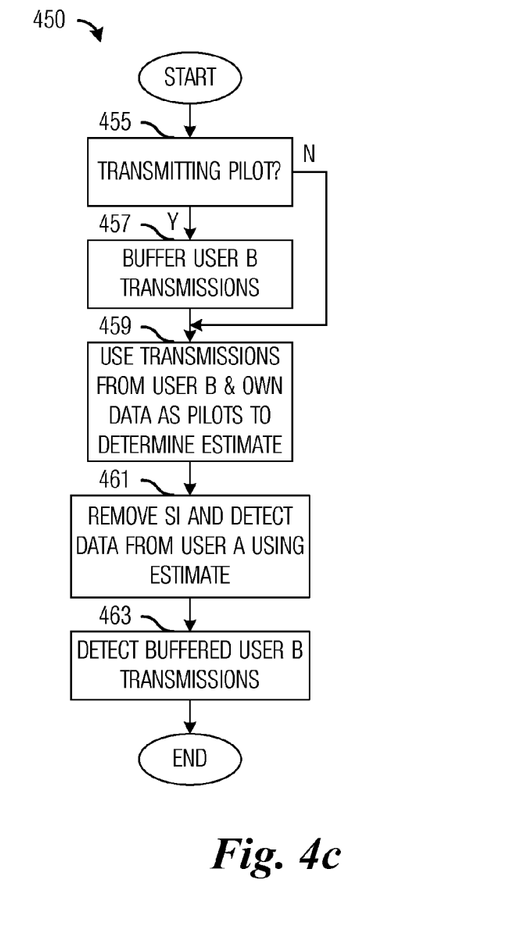
FIG. 4c is a flow diagram of communications device operations in detecting information from a transmission relayed by a two-way RN, wherein the communications device transmits a first estimation period.

FIG. 4c illustrates a flow diagram of communications device operations 450 in detecting information from a transmission relayed by a two-way RN, wherein the communications device transmits a first estimation period. Without loss of generality, in a non-overlapping transmission of estimation periods, one communications device may be considered to be communications device that transmits its estimation period first. Communications device operations 450 may be indicative of operations occurring in a communications device, such as user A (for example, a UE), wherein the communications device transmits the first estimation period. Communications device operations 450 may occur while the communications device is in a normal operating mode.

Communications device operations 450 may begin with the communications device performing a check to determine if it is transmitting its pilot signals during its estimating period (block 455). Since the communications device is transmitting its estimating period first, if the communications device is transmitting pilot signals, then the other communications device is transmitting information. Since the communications device is transmitting its estimating period first, it has not had an opportunity to estimate the channel. Therefore, in order to prevent loss of information, the communications device may buffer transmissions from the other communications device and relayed to the communications device by the RN in the form of a composite signal (block 457). According to an embodiment, the communications device may buffer the composite signal relayed to the communications device by the RN.

If the communications device is not transmitting its pilot signals, then the communications device may make use of pilot signals from the other communications device and relayed to the communications device by the RN in the form of a composite signal along with its own information to perform estimation on a channel between the communications device and the other communications device (block 459). According to an embodiment, the communications device may use LSE to perform the channel estimation. The communications device may use the channel estimate to remove SI and detect information contained in the transmission for a remainder of a transmission frame (block 461). The communications device may also detect information contained in the buffered transmissions from the other communications device using the channel estimate (block 463). Preferably, detecting information contained in the buffered transmissions occurs prior to detecting information contained in a remainder of the transmission frame. However, detecting information contained in the buffered transmissions may occur after detecting information contained in a remainder of the transmission frame. Communications device operations 450 may then terminate.

Referencing FIG. 4a, from the beginning of the transmission frame to time $T_B$, the communications device transmits pilot signals while it receives information from the other communications device (by way of the RN). The communications device may buffer information from the other communications device since it does not have a channel estimate to detect the information from the other communications device. From time $T_B$ to time $T_A$, the communications device receives pilot signals from the other communications device while it transmits its own information. The communications device may make use of the pilot signals from the other communications device and its own information to estimate the channel. The communications device may use the channel estimate to remove SI and detect the information from the other communications device (both newly received information from the other communications device and the buffered information).

Figure 5A:
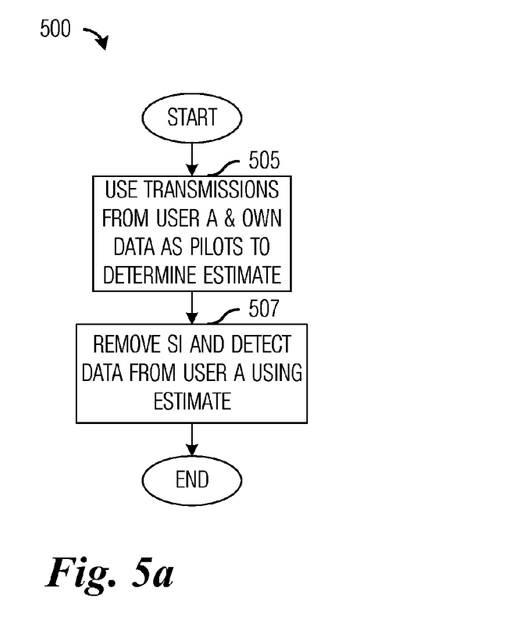
FIG. 5a is a flow diagram of communications device operations in detecting information from a transmission relayed by a two-way RN, wherein communications device operations occurs at a first communications device where the first communications device requires a shorter estimation period and/ or its estimation period occurs after an estimation period of a second communications device.

FIG. 5a illustrates a flow diagram of communications device operations 500 in detecting information from a transmission relayed by a two-way RN, wherein communications device operations 500 occurs at a first communications device where the first communications device requires a shorter estimation period and/or its estimation period occurs after an estimation period of a second communications device. Communications device operations 500 may be indicative of operations occurring at the first communications device while the first communications device is in a normal operating mode.

Communications device operations 500 may begin with the first communications device using pilot signals transmitted by another communications device (e.g., the second communications device) and relayed to the first communications device by the RN in the form of a composite signal to perform estimation on a channel between the first communications device and the second communications device (block 505). According to an embodiment, the first communications device may use LSE to perform the channel estimation.

As an example, referencing FIG. 3a, let the first communications device be user B and the second communications device be user A. Up until time $T_B$, the first communications device may make use of pilot signals transmitted by the second communications device to perform channel estimation. After time $T_B$, when the second communications device begins to transmit information, the first communications device may utilize the channel estimate to detect the information.

As another example, referencing FIG. 4a, from the beginning of the transmission frame until time $T_B$, the first communications device transmits information while it receives pilot signals from the second communications device. At time $T_B$, the first communications device uses its own transmitted information and the pilot signal from the second communications device to estimate the channel, for example, using LSE. From time $T_B$ forward, the first communications device may use the channel estimate to remove SI and detect the information transmitted by the second communications device.

Returning now to FIG. 5a, the first communications device may use the channel estimate to remove SI and detect information contained in the transmission for a remainder of a transmission frame (block 507). Communications device operations 500 may then terminate.

Figure 5B:
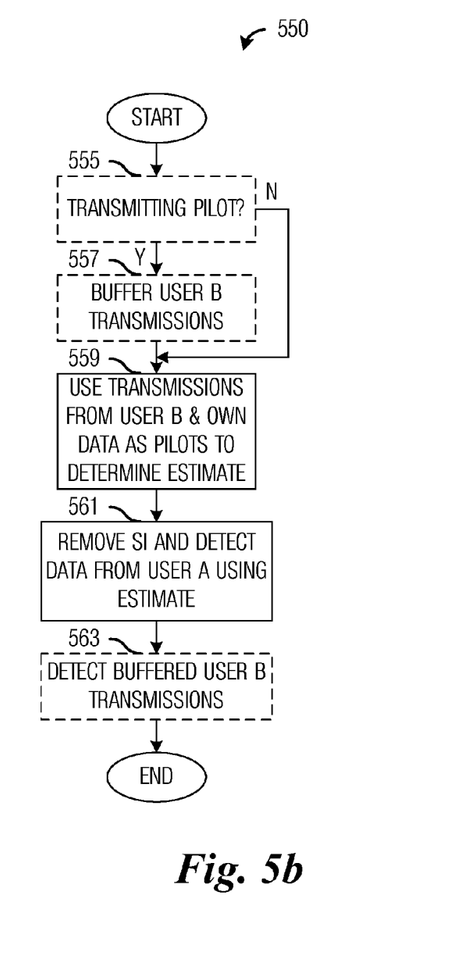
FIG. 5b is a flow diagram of communications device operations in detecting information from a transmission relayed by a two-way RN, wherein communications device operations occurs at a second communications device where the second communications device requires a longer estimation period and/or its estimation period occurs before an estimation period of a first communications device.

FIG. 5b illustrates a flow diagram of communications device operations 550 in detecting information from a transmission relayed by a two-way RN, wherein communications device operations 550 occurs at a second communications device where the second communications device requires a longer estimation period and/or its estimation period occurs before an estimation period of a first communications device. Communications device operations 550 may be indicative of operations occurring at the second communications device while the second communications device is in a normal operating mode.

Communications device operations 550 may begin with the second communications device optionally determining if it is transmitting pilot signals if the second communications device is operating in a communications system with non-overlapping estimation periods (block 555). If the second communications device is transmitting pilot signals, then due to the non-overlapping estimation periods, the first communications device is transmitting information. Additionally since the second communications device's estimation period occurs before the first communications device's estimation period, the second communications device does not have a channel estimate. Hence, the second communications device may need to buffer transmissions from the first communications device and relayed to the second communications device by the RN in the form of a composite signal (block 557). According to an embodiment, the second communications device may buffer the composite signal relayed to the second communications device by the RN.

According to an embodiment, once the second communications device finishes transmitting pilot signals and begins to transmit information, the first communications device begins to transmit pilot signals. Therefore, the second communications device may use the transmissions of the first communications device (pilot signals) and relayed to the second communications device by the RN in the form of a composite signal and its own information as pilot signals to perform estimation on a channel between the second communications device and the first communications device (block 559). According to an embodiment, the second communications device may use LSE to perform the channel estimation.

As an example, referencing FIG. 3a, up until time $T_A$, the second communications device receives and stores information from the other communications device by way of the RN. Before time $T_B$, the second communications device may treat the information from the information from the first communications device as regular pilot signals, while between times $T_B$ and $T_A$, the second communications device may treat its own transmissions as pilot signals. The second communications device may estimate the channel using the pilot signals. After time $T_A$, the communications device may use the channel estimate to detect the information.

As another example, referencing FIG. 4a, from the beginning of the transmission frame to time $T_B$, the second communications device transmits pilot signals while it receives information from the first communications device (by way of the RN). The second communications device may buffer information from the first communications device since it does not have a channel estimate to detect the information from the first communications device. From time $T_B$ to time $T_A$, the second communications device receives pilot signals from the first communications device while it transmits its own information. The second communications device may make use of the pilot signals from the first communications device and its own information to estimate the channel. The second communications device may use the channel estimate to remove SI and detect the information from the first communications device (both newly received information from the first communications device and the buffered information).

Returning now to FIG. 5b, the second communications device may use the channel estimate to remove SI and detect information contained in the transmission for a remainder of a transmission frame (block 561). Furthermore, the second communications device may optionally detect information contained in buffered transmissions from the first communications device if the second communications device is operating in a communications system with non-overlapping estimation periods (block 563). Preferably, detecting information contained in the buffered transmissions occurs prior to detecting information contained in a remainder of the transmission frame. However, detecting information contained in the buffered transmissions may occur after detecting information contained in a remainder of the transmission frame. Furthermore, self-interference may also need to be removed from the buffered transmissions. Communications device operations 550 may then terminate.

Figure 6:
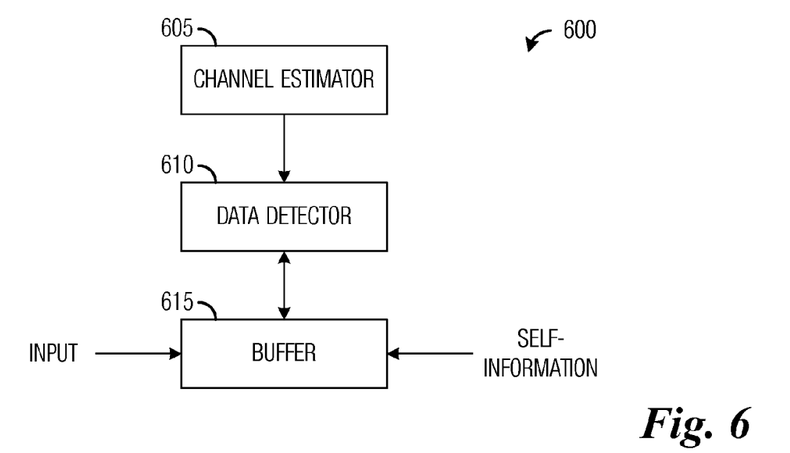
FIG. 6 is a diagram of a portion of a communications device.

FIG. 6 illustrates a portion of a communications device 600. According to an embodiment, communications device 600 may need to buffer self-information, that is, be able to remove SI for data detection. Communications device 600 may also need to buffer data transmitted by another communications device while it does not yet have a channel estimate to use in detecting information contained in the transmission from the other communications device.

Communications device 600 includes a channel estimator 605 to estimate a channel based on pilot signals transmitted by the other communications device (and/or its own transmissions). Communications device 600 also includes a data detector 610 coupled to the channel estimator 605 and a buffer 615 coupled to data detector 610. Data detector 610 may be used to detect pilot signals and/or information contained in transmissions, while buffer 615 may be used to store transmissions from an input (e.g., an antenna for over-the-air transmissions) or from itself (e.g., self-information to be used as pilot signals). According to an embodiment, data detector 610 may or may not also be used to remove self-interference. For example, a separate unit may be used to provide self-interference removal.

Figure 7:
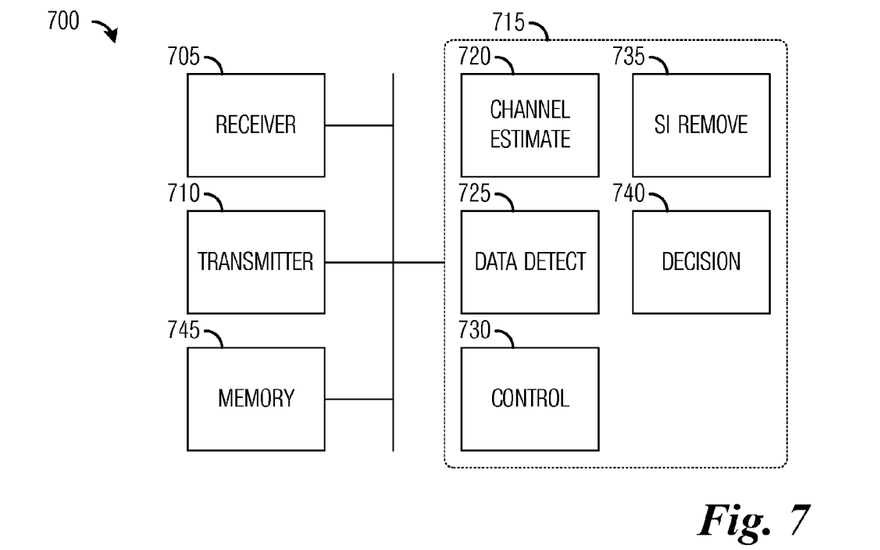
FIG. 7 is an alternate illustration of a communications device.

FIG. 7 provides an alternate illustration of a communications device 700. Communications device 700 may be used to implement various ones of the embodiments discussed herein. As shown in FIG. 7, a receiver 705 is configured to receive information (such as transmissions of pilot signals and information) and a transmitter 710 is configured to transmit information (such as information and pilot signals).

A channel estimate unit 720 is configured to estimate a channel between communications device 700 and another communications device. A data detect unit 725 is configured to detect information contained in a received transmission. A control unit 730 is configured to control the operation of data detect unit 725 and channel estimate unit 720 depending on transmissions received by communications device 700 and transmissions made by communications device 700. A SI remove unit 735 is configured to remove self-interference. A decision unit 740 is configured to determine contents of transmissions received by communications device 700. A memory 745 is configured to store received transmissions, channel estimates, self-information, and so forth.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, receiver 705 and transmitter 710 may be implemented as specific hardware blocks, while channel estimate unit 720, data detect unit 725, control unit 730, SI remove unit 735, and decision unit 740 may be software modules executing in a processor 715 or custom compiled logic arrays of a field programmable logic array.

Figure 8:
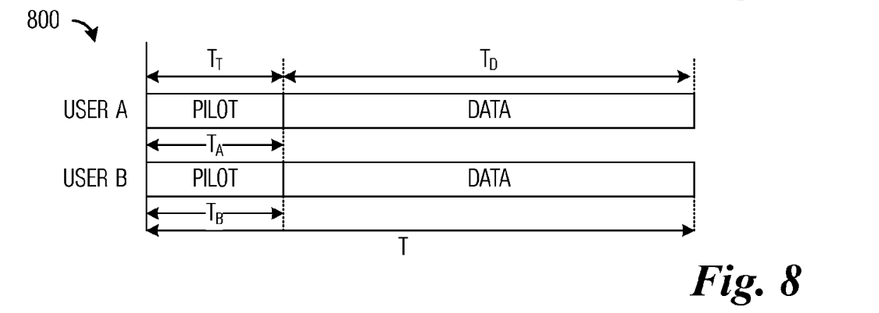
FIG. 8 is a diagram of a transmission diagram of transmissions over a single transmission frame by user A and user B.

FIG. 8 illustrates a transmission diagram 800 of transmissions over a single transmission frame by user A and user B. Transmission diagram 800 displays a relationship between an estimation period with duration $T_T$ and a data period with duration $T_D$ to an overall transmission frame with duration T. Transmission diagram 800 is used in a timing and performance analysis presented below.

Based on transmission diagram 800, the following may be expressed:

$$r_R = H_1 s_A + G_1 s_B + n_R,$$

$$P_A = \frac{1}{M} E\{s_A^H s_A\} = \rho,$$

$$P_B = \frac{1}{M} E\{s_B^H s_B\} = \rho,$$

$$W = \mu I_N,$$

-continued $$P = \frac{1}{N} E\{r_R^H W^H W r_R\} = 2\rho,$$

$$\mu = \sqrt{\frac{2\rho N}{\sigma_{\tilde{H}_1}^2 M \rho + \sigma_{\tilde{G}_1}^2 M \rho + N}},$$

and $$y_A = H_2 W r_R \quad (1)$$

$$= (H_2 W H_1) s_A + (H_2 W G_1) s_B + H_2 W n_R + n_A \quad (2)$$

$$= H_A s_A + G_A s_B + \tilde{n}_A. \quad (3)$$

Considering a successive and simultaneous transmission of τ vectors from user A and user B, it is possible to denote the transmitted codeword from user A as $S_A \triangleq [s_A^{(1)}, s_A^{(2)}, \ldots, s_A^{(\tau)}]$. A similar expression may be derived for user B. Also, for notational convenience, let $S_A^{[\tau_0]}$ denote the first $\tau_0$ transmissions, i.e., the first $\tau_0$ columns of $S_A$ for any $1 \leq \tau_0 \leq \tau$. As an example, $S_A^{[2]} = [s_A^{(1)}, s_A^{(2)}]$. When the starting column is not the first column, $S_A^{[\tau_0, \tau_1]}$ may be used. The notation may be extended to received symbols and noise elements at user A and user B.

$$H_A \triangleq H_2 W H_1,$$

$$G_A \triangleq H_2 W G_1,$$

$$Y_A^{[\tau]} = H_A S_A^{[\tau]} + G_A S_B^{[\tau]} + \tilde{N}_A^{[\tau]} \quad (4)$$

$$= [H_A \ G_A] \begin{bmatrix} S_A^{[\tau]} \\ S_B^{[\tau]} \end{bmatrix} + \tilde{N}_A^{[\tau]} \quad (5)$$

$$= C_A \tilde{S}^{[\tau]} + \tilde{N}_A^{[\tau]}. \quad (6)$$

Similarly $$H_B \triangleq G_2 W H_1,$$

$$G_B \triangleq G_2 W G_1,$$

$$Y_B^{[\tau]} = H_B S_A^{[\tau]} + G_B S_B^{[\tau]} + \tilde{N}_B^{[\tau]} \quad (7)$$

$$= [H_B \ G_B] \begin{bmatrix} S_A^{[\tau]} \\ S_B^{[\tau]} \end{bmatrix} + \tilde{N}_B^{[\tau]} \quad (8)$$

$$= C_B \tilde{S}^{[\tau]} + \tilde{N}_B^{[\tau]}. \quad (9)$$

Without loss of generality assume that $T_B < T_A$. The transmitted codeword from user A is of the form $S_A = [P_A \ D_A]$, where $P_A = S_A^{[T_B]} = [p_A^{(1)}, p_A^{(2)}, \ldots, p_A^{(T_B)}]$ is the pilot matrix that is known a-priori to both user A and user B, while $D_A$ is a M×(T−$T_B$) matrix of data symbols intended for user B. Similarly, for user B, $S_B = [P_B \ D_B]$, where $P_B = S_B^{[T_A]} = [p_B^{(1)}, p_B^{(2)}, \ldots, p_B^{(T_A)}]$ and $D_B$ is a M×(T−$T_A$) matrix of data symbols intended for user A. Detection of $D_B$ at user A ($D_A$ at user B), requires estimation of the effective channels from user B to user A (user A to user B).

Estimation at user B: Channel estimation at user B may be possible immediately after the transmission of the pilot matrix from user A. Using Equation (7)

$$Y_B^{[T_B]} = C_B \tilde{S}^{[T_B]} + N_B^{[T_B]}, \quad (10)$$

where $$\tilde{S}^{[T_B]} = \begin{bmatrix} S_A^{[T_B]} \\ S_B^{[T_B]} \end{bmatrix} = \begin{bmatrix} P_A \\ P_B^{[T_B]} \end{bmatrix}.$$

Since $T_B < T_A$, $\tilde{S}^{[T_B]}$ is completely known a-priori to user B. A least squares estimate of the channel may be expressed as:

$$\hat{C}_B = \underset{C_B}{\operatorname{argmin}} \left\| Y_B^{[T_B]} - C_B \tilde{S}^{[T_B]} \right\|_F^2 = Y_B^{(T_B)} (\tilde{S}^{[T_B]})^H (\tilde{S}^{[T_B]} (\tilde{S}^{[T_B]})^H)^{-1}. \quad (12)$$

An LMMSE estimate is one that (linearly) minimizes $E\{\|C_B - \hat{C}_B\|_F^2\}$, which is expressible as $$\hat{C}_B = Y_B^{[T_B]} R_{Y_B^{[T_B]} C_B} R_{Y_B^{[T_B]}}^{-1} \quad (13)$$

$$= Y_B^{[T_B]} \left[ (\tilde{S}^{[T_B]})^H R_{C_B} \tilde{S}^{[T_B]} + \frac{M \sigma_{\tilde{n}}^2}{\rho} I_{T_B} \right]^{-1} (\tilde{S}^{[T_B]})^H R_{C_B}. \quad (14)$$

Estimation at user A: To estimate the channel at user A, received vectors at user A up to time $T_B$ are examined with respect to Equation (4), which may be expressed as $$Y_A^{[T_A]} = C_A \tilde{S}^{[T_A]} + \tilde{N}_A^{[T_A]} \quad (15)$$

for $$\tilde{S}^{[T_A]} = \begin{bmatrix} S_A^{[T_A]} \\ S_B^{[T_A]} \end{bmatrix} = \begin{bmatrix} P_A D_A^{[T_A - T_B]} \\ P_B \end{bmatrix}, \quad (16)$$

where $D_A^{[T_A - T_B]}$ is the first ($T_A - T_B$) columns of $D_A$. Since the matrix is known to user A, the pilot matrix $\tilde{S}^{[T_A]}$ is completely known a-priori to user A and a least squares estimate of the channel follows in a manner similar to Equation (12) with $Y_A^{[T_A]}$ and $\tilde{S}^{[T_A]}$ substituted for $Y_B^{[T_B]}$ and $\tilde{S}^{[T_B]}$.

Data detection: With an estimate of the effective channel at user A of the form $\hat{C}_A = [\hat{H}_A \ \hat{G}_A]$, data detection of the M data streams from user B may be obtained via a zero-forcing solution which would first subtract the estimated self-interference and then invert the channel to obtain $\hat{D}_B = \hat{G}_A^{-1}[Y_A^{[T_A+1:\tau]} - \hat{H}_A D_A]$ and similarly $\hat{D}_A = \hat{H}_B^{-1}[Y_B^{[T_B+1:\tau]} - \hat{G}_B D_B]$ at user B.

Effect on information rate: Define $\tilde{C}_A \triangleq C_A - \hat{C}_A$ as a channel estimation error at user A so that $\tilde{H}_A \triangleq H_A - \hat{H}_A$ and $\tilde{G}_A \triangleq G_A - \hat{G}_A$. The mutual information between what is seen (i.e., known) at a receiver and what is transmitted from the source (i.e., unknown) is expressible as $$I(Y_A^{[\tau]}, S_A^{[\tau]}, S_B^{[T_A]}; S_B^{[T_A+1:\tau]}) = I(Y_A^{[T_A+1:\tau]}, Y_A^{[T_A]}, S_A^{[\tau]}, S_B^{[T_A]}; S_B^{[T_A+1:\tau]})$$

$$= I(Y_A^{[T_A+1:\tau]}, Y_A^{[T_A]}, \tilde{S}^{[T_A]}, S_A^{[T_A+1:\tau]}; S_B^{[T_A+1:\tau]})$$

-continued $$\geq I\left(Y_A^{[T_A+1:\tau]}, \underbrace{f(Y_A^{[T_A]}, \tilde{S}^{[T_A]})}_{\hat{C}_A}, S_A^{[T_A+1:\tau]}; S_B^{[T_A+1:\tau]}\right)$$

$$= \underbrace{I(\hat{C}_A; S_B^{[T_A+1:\tau]})}_{=0} + I(Y_A^{[T_A+1:\tau]}, S_A^{[T_A+1:\tau]}; S_B^{[T_A+1:\tau]} | \hat{C}_A)$$

$$= \underbrace{I(S_A^{[T_A+1:\tau]}; S_B^{[T_A+1:\tau]} | \hat{C}_A)}_{=0} + I(Y_A^{[T_A+1:\tau]}; S_B^{[T_A+1:\tau]} | \hat{C}_A, S_A^{[T_A+1:\tau]})$$

$$= I\left(Y_A^{[T_A+1:\tau]} - \underbrace{\hat{H}_A S_A^{[T_A+1:\tau]}}_{self-interference}; S_B^{[T_A+1:\tau]} | \hat{C}_A, S_A^{[T_A+1:\tau]}\right)$$

$$= I(\tilde{Y}_A^{[T_A+1:\tau]}; S_B^{[T_A+1:\tau]} | \hat{H}_A, \hat{G}_A, S_A^{[T_A+1:\tau]}).$$

Using Equation (4), it readily follows that $\tilde{Y}_A^{[T_A+1:\tau]} = \hat{G}_A S_B^{[T_A+1:\tau]} + \tilde{V}_A$ in the above, where $\tilde{V}_A = \tilde{H}_A S_A^{[T_A+1:\tau]} + \tilde{G}_A S_B^{[T_A+1:\tau]} + \tilde{N}_A^{[T_A+1:\tau]}$ is an effective noise matrix.

$$R_{BA} \geq \left(\frac{\tau - T_A}{\tau}\right) \log_2 \det\left(I_M + \frac{\rho_{eff}}{M} A^H A\right), \quad (18)$$

$$\rho_{eff} = \frac{\rho(1-\sigma_{\tilde{C}}^2)}{1+2\rho\sigma_{\tilde{C}}^2}, \quad (19)$$

$$x_{ii} = \begin{cases} 1 & \text{if } i^{th} \text{ subcarrier is pilot} \\ 0 & \text{if } i^{th} \text{ subcarrier is data} \end{cases} \quad (20)$$

$$x_{ij} = 0, \forall i \neq j.$$

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operations at a first communications device, the method comprising:
   transmitting a first pilot signal;
   receiving, on a channel from a relay node, a first combined signal comprising a retransmission of the first pilot signal, and comprising first non-pilot data information relayed from a second communications device;
   buffering the first non-pilot data information;
   transmitting second non-pilot data information;
   receiving, on the channel from the relay node, a second combined signal comprising a retransmission of the second non-pilot data information, and comprising a second pilot signal relayed from the second communications device;
   computing an estimate of the channel between the second communications device and the first communications device in accordance with the second combined signal;
   removing self-interference from a composite transmission relayed to the first communications device from the relay node, wherein the composite transmission comprises first data transmissions from the first communications device and second data transmissions from the second communications device;
   detecting transmitted data information contained in the second data transmissions from the second communications device from the composite transmission in accordance with the estimate of the channel: and
   detecting buffered data information contained in the buffered first non-pilot data information in accordance with the estimate of the channel, after computing the estimate of the channel.

2. The method of claim 1, further comprising:
   wherein the second pilot signal and the second data transmissions from the second communications device are not buffered.

3. The method of claim 1, wherein detecting the buffered data information occurs after detecting the transmitted data information.

4. The method of claim 1, wherein detecting the buffered data information occurs prior to detecting the transmitted data information.

5. The method of claim 1, further comprising removing self-interference from the buffered first non-pilot data information prior to detecting the buffered data information.

6. The method of claim 1, wherein buffering the first non-pilot data information occurs while the first communications device is transmitting the first pilot signal, and wherein buffering the first non-pilot data information stops once the first communications device stops transmitting pilot signals.

7. The method of claim 1, wherein computing the estimate of the channel is further in accordance with the first pilot signals.

8. The method of claim 7, wherein computing the estimate of the channel occurs before the second communications device stops transmitting the second pilot signal.

9. The method of claim 1, wherein computing the estimate comprises using least squares estimation on the second combined signal.

10. The method of claim 1, wherein removing the self-interference occurs prior to detecting the transmitted data information.

11. The method of claim 1, wherein detecting the transmitted data information occurs after the second communications device stops transmitting the second pilot signal.

12. The method of claim 11, wherein communications occur in a frame basis, and wherein detecting the transmitted data information continues until an end of a frame is reached.

13. The method of claim 1, wherein the first communications device is operating in an unequal estimation mode with respect to the second communications device.

14. A first communications device comprising:
a transmitter configured to:
transmit a first pilot signal; and
transmit first non-pilot data information;
a receiver configured to:
receive, on a channel from a relay node, a first combined signal comprising a retransmission of the first pilot signal, and comprising a second pilot signal relayed from a remote communications device; and
receive, on the channel from the relay node, a second combined signal comprising a retransmission of the first non-pilot data information, and comprising a third pilot signal relayed from the remote communications device; and
a processor coupled to the transmitter and the receiver, and configured to
compute an estimate of the channel between the remote communications device and the first communications device in accordance with the first and second combined signals;
remove self-interference from a composite transmission related to the first communications device from the relay node, wherein the composite transmission comprises first data transmissions from the first communications device and second data transmissions from the remote communications device; and
detect transmitted data information contained in the second data transmissions from the remote communications device from the composite transmission in accordance with the estimate of the channel.

15. The first communications device of claim 14, wherein the processor is further configured to compute the estimate of the channel in accordance with the first pilot signal and the second pilot signal.

16. The first communications device of claim 15, wherein the processor is further configured to compute the estimate of the channel in accordance with the third pilot signal and the first non-pilot data information.

17. The first communications device of claim 16, wherein the processor is further configured to compute the estimate of the channel first in accordance with the first and second pilot signals, and then in accordance with the third pilot signal and the first non-pilot data information.

18. A first communications device comprising:
a transmitter configured to:
transmit a first pilot signal; and
transmit second non-pilot data information;
a receiver configured to:
receive, on a channel from a relay node, a first combined signal comprising a retransmission of the first pilot signal, and comprising first non-pilot data information relayed from a remote communications device; and
receive, on the channel from the relay node, a second combined signal comprising a retransmission of the second non-pilot data information, and comprising a second pilot signal relayed from the remote communications device;
a buffer configured to buffer the first non-pilot data information; and
a processor coupled to the transmitter, the receiver and the buffer, and configured to:
compute an estimate of the channel between the remote communications device and the first communications device in accordance with the second combined signal;
remove self-interference from a composite transmission relayed to the first communications device from the relay node, wherein the composite transmission comprises first data transmissions from the first communications device and second data transmissions from the remote communications device;
detect transmitted data information contained in the second data transmissions from the remote communications device from the composite transmission in accordance with the estimate of the channel; and
detect buffered data information contained in the buffered first non-pilot data information in accordance with the estimate of the channel, after the compute the estimate of the channel.

19. The first communications device of claim 18, wherein the processor is configured to detect the buffered data information after the detect the transmitted data information.

20. The first communications device of claim 18, wherein the processor is configured to detect the buffered data information prior to the detect the transmitted data information.

21. The first communications device of claim 18, wherein the processor configured to compute the estimate comprises the processor configured to use least squares estimation on the second combined signal.

22. A method for operations at a first communications device, the method comprising:
transmitting a first pilot signal;
receiving, on a channel from a relay node, a first combined signal comprising a retransmission of the first pilot signal, and comprising a second pilot signal relayed from a second communications device;
transmitting first non-pilot data information;
receiving, on the channel from the relay node, a second combined signal comprising a retransmission of the first non-pilot data information, and comprising a third pilot signal relayed from the second communications device;
computing an estimate of the channel between the second communications device and the first communications device in accordance with the first and second combined signals;
removing self-interference from a composite transmission relayed to the first communications device from the relay node, wherein the composite transmission comprises first data transmissions from the first communications device and second data transmissions from the second communications device; and
detecting transmitted data information contained in the second data transmissions from the second communications device from the composite transmission in accordance with the estimate of the channel.

23. The method of claim 22, wherein computing the estimate of the channel comprises computing the estimate of the channel in accordance with the first pilot signal and the first non-pilot data information.

24. The method of claim 23, wherein computing the estimate of the channel further comprises computing the estimate of the channel in accordance with the second and third pilot signals.

25. The method of claim 24, wherein computing the estimate of the channel comprises computing the estimate of the channel first in accordance with the first and second pilot signals, and then in accordance with the third pilot signal and the first non-pilot data information.

* * * * *